3,552,177
STRAP FORMER AND PLACEMENT APPARATUS
Anthony W. Orlando, Highland, and Anthony A.
  Pantusco, Newburgh, N.Y., assignors to International
  Business Machines Corporation, Armonk, N.Y., a corporation of New York
Filed Feb. 19, 1968, Ser. No. 706,444
Int. Cl. B21d 28/00, 31/00
U.S. Cl. 72—338        10 Claims

ABSTRACT OF THE DISCLOSURE

Appratus for forming and depositing discrete portions (straps) of formed, preferably pretinned material at a predetermined position, such as on a substrate. As disclosed, the apparatus includes a pair of contiguous forming and drive rolls having circumferentially disposed, substantially complementary forms adapted for receiving and forming therebetween at least one continuous strip of material which is supplied to the rolls on a reel type supply dispenser. The rolls feed the formed strip onto a tray, the tray having, at one end thereof, a terminal fixed first shear end adapted to cooperate with a perpendicularly oriented reciprocating shear blade, the terminal shear end and shear blade operating to remove the discrete portions of the strip. The shear blade also includes vacuum holding means for retaining a discrete portion (strap) upon shear of the strip, the shear moving past the terminal shear end for depositing the discrete portion upon subjacent substrates. The apparatus also includes a novel dimpling pad which operates adjacent to the shear blade for providing an indentation in the strip prior to the shearing of the strip, so that the strap next to be sheared and positioned on the substrate will have dimples therein for location on projections from the substrate.

---

The present invention relates to apparatus for forming and depositing formed material at a predetermined location, and more particularly relates to apparatus for forming a continuous strip of material, shearing the strip into discrete portions, and depositing the discrete portions at a predetermined location.

Transistor chip placement on a substrate to form a module has been accomplished heretofore by connecting, by solder reflow, tinned copper balls to the chip, which balls correspond to the emitter, base and collector of the chip, and placing the chip with the copper coated balls thereon against previously dimpled land (or leads) on the substrate. The substrate is then heated to cause solder reflow and the chip is soldered to the substrate. As the ability of the technology to create higher powered transistor chips has grown, higher service failure has become more evident. The higher failure is attributable to insufficient heat transfer of the higher power transistor chip which raises the ambient temperature of the chip causing premature failure. As the chip typically contains a common side, normally the collector of the transistor, it has been determined that if the chip could be placed upside down and soldered to a pad of solder, better heat dissipation would occur. However, the emitter and base contact or balls would, in this configuration, be projecting upwardly from the module necessitating connections to the lands or leads on the module from the upwardly projecting balls.

Several methods of connecting the emitter and base contacts to lands have been attempted, for example, right angle straps have been utilized to connect the balls to their subjacent land contacts on the module. This method of connecting the balls to the strap is successful, the extreme miniaturization of the strap, due to the smallness of the chip, however, has raised problems with cutting and placement of the strap onto the upwardly projecting balls of the chip. The shearing of a right angle piece requires special shear apparatus, including an anvil against which the strip is pressed as the shear strikes the piece. In addition, it is necessary to provide for the removal of the anvil in order to place the strap in position, or to provide a separate pick-up for the strap after it has been sheared and place the strap upon the ball and land. A steady reciprocation of the shear upon the anvil also creates certain additional problems, such as material build-up which, after a period of time, deleteriously effects the proper severing of the strap.

In view of the above, it is a principal object of the present invention to provide a simple machine for forming and severing a continuous strip of material to form discrete portions or straps, and to permit depositing the strap in a predetermined position on adjacent elements such as substrates.

Another object of the present invention is to provide novel forming and drive rolls for feeding the strip of material into a position for shearing.

Still another object of the present invention is to provide a strap forming and placement apparatus which may be utilized in conjunction with a conveyor system in which a substrate is positioned for receipt of chip thereon, so that the discrete portions forming the straps may be positioned on the chips upon the chips and substrate being conveyed to a position adjacent the strap dispensing apparatus.

Yet another object of the present invention is to provide apparatus of the aforementioned type wherein the dispensing and positioning portion of the apparatus may be oriented in order to facilitate exact placement of the strap on the chip and substrate.

Another object of the present invention is to provide novel strap retaining means for holding the strap thus formed when shearing a strip of material, and retaining the strap on the shear until it is positioned on the chip.

Still another object of the present invention is to provide novel dimpling apparatus operative in conjunction with shear apparatus to form indentations on the material for better orientation and retention thereof on elements upon which the material is to be positioned.

Other objects and a fuller understanding of the invention may be had by referring to the following specifications and claims taken in conjunction with the accompanying drawings in which;

Referring now to the drawings, and especially FIG. 1 thereof, a semiconductor chip C is shown mounted on a substrate S, the portion C' of which is connected in a manner to be more fully explained hereinafter, to a collector land (electrode or lead) L1. As shown, the chip C includes a pair of contact balls E and B respectively which project upwardly and are connected to lands L2 and L3 by straps 10 and 11. The lands include an enlarged portion P, commonly referred to as pads, which constitute, along with the lands, the printed circuit on the substrate S.

Figures 1, 2:
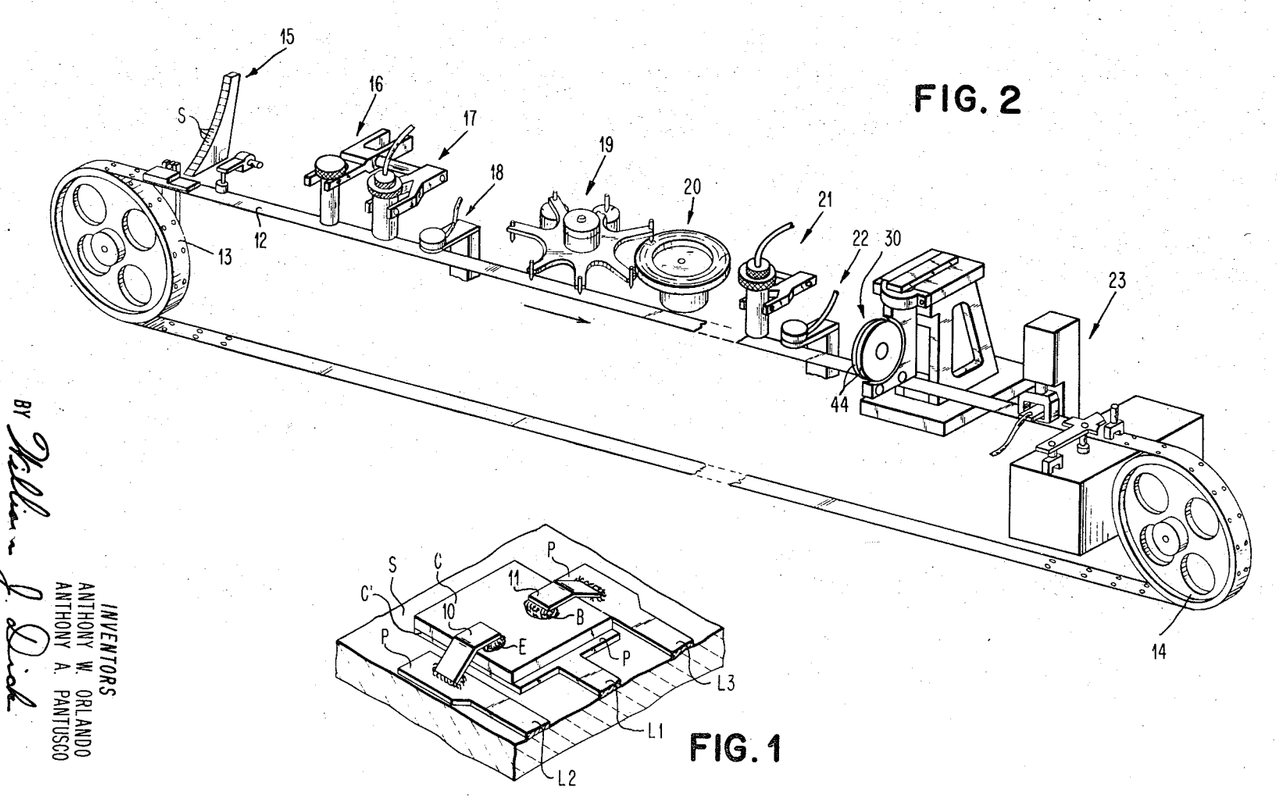
FIG. 1 is an enlarged fragmentary perspective view of a substrate having a chip positioned thereon with the straps, formed by the novel apparatus of the present invention, shown positioned contacting both the chip and lands associated with the substrate.
FIG. 2 is a fragmentary perspective view illustrating schematically exemplary apparatus for forming modules with which the apparatus of the present invention may be associated.

Referring now to FIG. 2, an illustrative module fabrication line with which the apparatus of the present invention may be utilized, is shown therein. As illustrated, a conveyor 12 extends in a continuous manner about a pair spaced pullleys 13 and 14, the conveyor being intermittently movable as by drive means (not shown) to dispose a work piece, in the present instance a substrate S, beneath various operating stations. Briefly, the fabricating line may include a substrate dispenser 15 which loads the conveyor 12, at spaced intervals, with individual substrates having thereon the proper land patterns As the conveyor 12 moves in the direction of the arrow, a flattener 16 serves to flatten the solder pads so that the pads may more easily retain the chip C when it is positioned thereon. The substrate S is then moved beneath a flux dispenser 17, the flux dispenser 17 operating to place a quantity of flux on the pad P of land L1 which is to be associated with the backside C' or collector of the chip. Thereafter, the flux is flattened as by a flux flattener 18 so as to prevent mounding of the flux on the substrate S. One or more chips is then placed on the substrate S with the balls E and B projecting upwardly, and the rear side C' of the chip C downwardly on the pad P of the land L1. As a practical matter, each substrate normally contains more than one chip, and accordingly there will be a plurality of chip placement heads 19 along with an associated chip vibratory feeder bowl 20 for each of the placement heads 19. Thereafter, a second flux dispenser 21 positions flux on the balls E, B and the pads P associated with the lands L2 and L3. For reasons above set forth, the flux is flattened by a second flux flattener 22 and the positioned chip, mounted on the substrate S, is carried by the conveyor 12 beneath the strap former and placement apparatus 30 of the present invention. At this station, the chip C has positioned thereon a pair of straps 10–11, above described, and the substrate S passes beneath a chip presence sensor 23 which indicates the presence or absence of a particular chip and/or strap.

Figure 8:
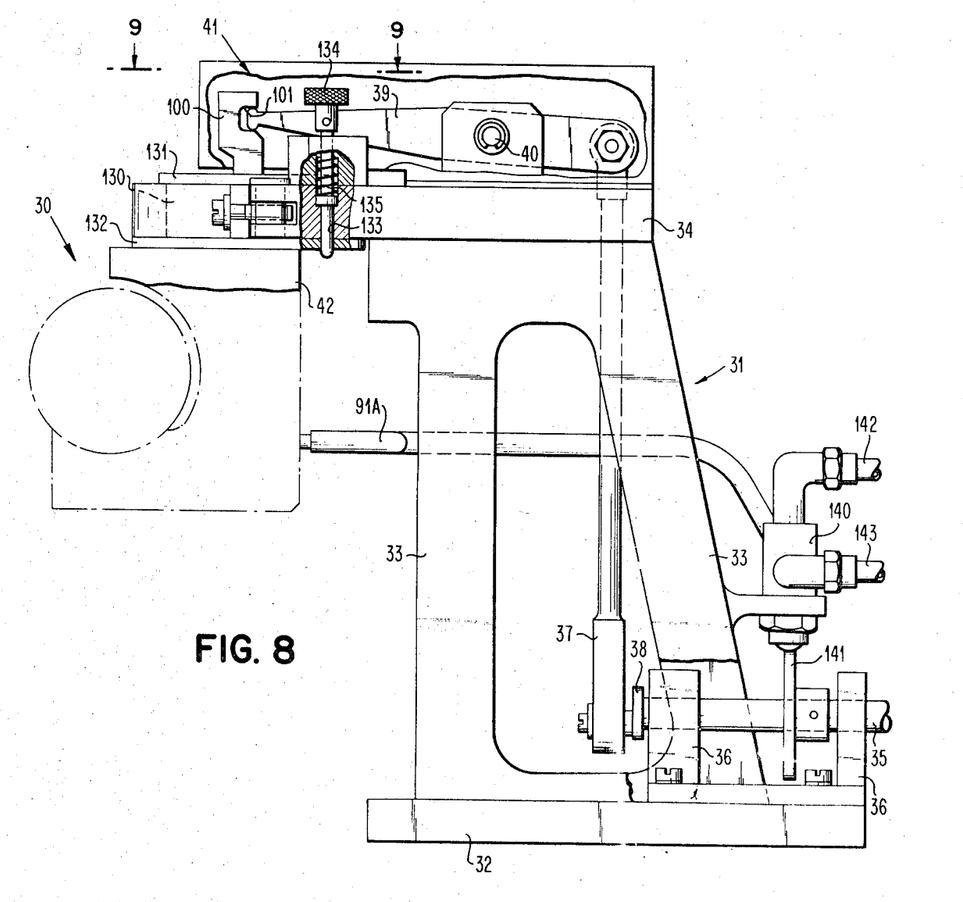
FIG. 8 is a fragmentary side elevational view of another portion of the apparatus shown in FIGS. 1 through 7.

In accordance with the invention, the apparatus 30 operates to form, shear and position at least one strap, in the present instance two straps, on the balls E and B as well as the lands L2 and L3. To this end, and referring first to FIG. 8, the strap former and placement apparatus 30 is adjustably coupled to a stand 31 which includes a base 32 and upstanding support members 33 supporting a platform 34 to which is connected the depending apparatus 30. As shown in FIG. 8, a shaft 35 is rotatably supported as by trunnions 36, and includes at one end thereof an eccentrically mounted connecting rod 37, connected to the shaft 35 as by a disc 38, the connecting rod 37 being connected at its upper end to a beam 39 which rocks about a pivot support 40 to cause reciprocation of a vertically oriented drive means 41 associated with the strap former and placement apparatus 30.

Figure 3:
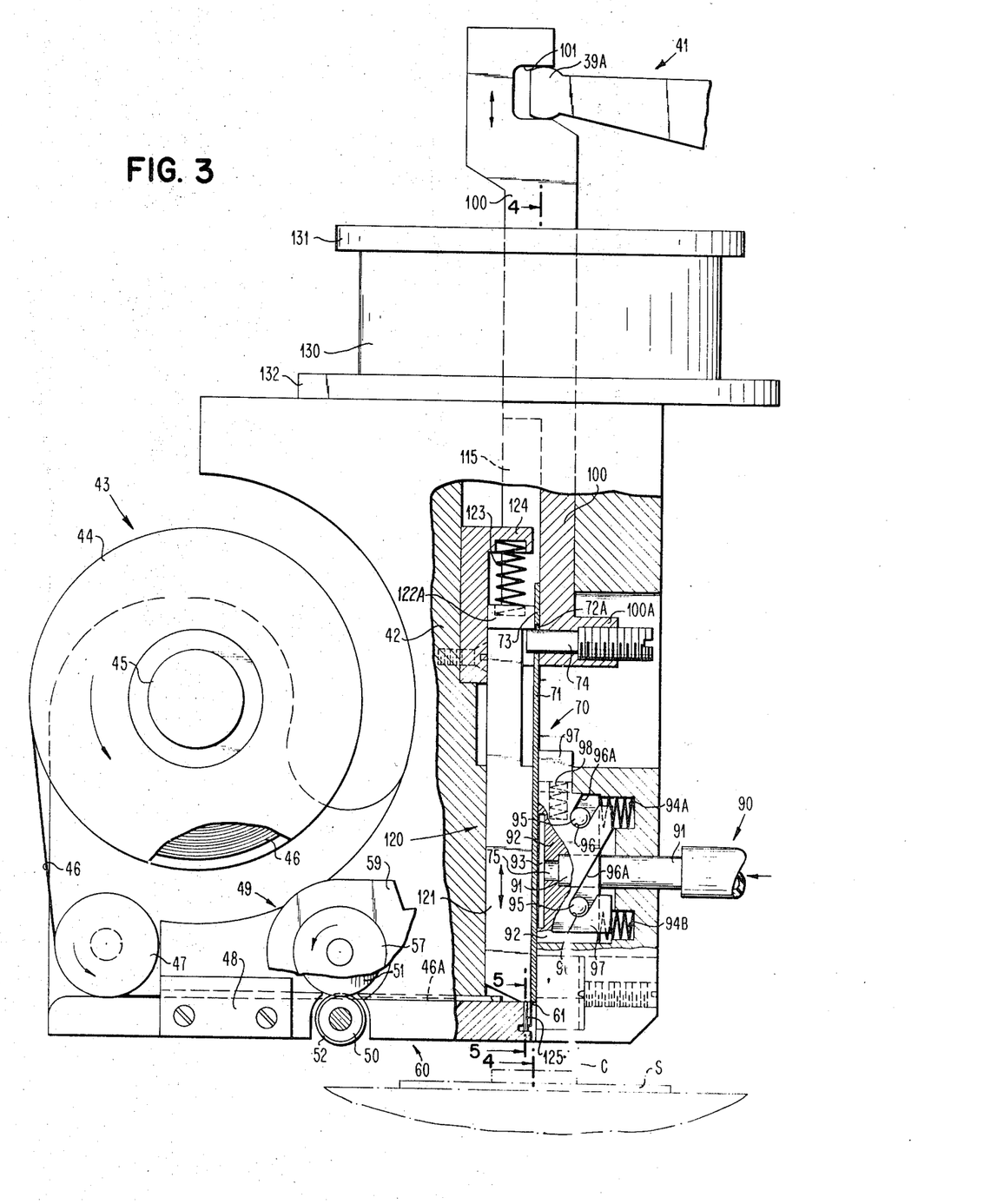
FIG. 3 is a fragmentary side elevational view of a portion of the apparatus of the present invention, with certain parts removed to more clearly illustrate certain features of the invention.

The apparatus shown in FIG. 3 forms the main operating portion of the apparatus 30, for forming, shearing and placing the straps 10 and 11 on the substrate S. Referring now to FIG. 3, a frame 42 has mounted thereon strip supply means 43, in the present instance including a pair of laterally spaced supply reels 44 rotatably mounted on a shaft 45. Separate continuous lengths of strip-like material 46 extend from the supply means through a guide roller 47 into a guide platen 48 for guiding the strip-like material 46 into forming means 49. From the forming means 49, the formed strip material 46A is intermittently fed onto a tray means 60, the forming means being interconnected to the drive means 41 so as to provide an intermittent feed of the formed strip material 46A onto the tray 60. As shown in FIG. 3, the tray means 60 has a terminal shear end 61 which is longitudinally spaced from the forming means, and cooperates with reciprocating shear means 70, which shear means is operable between a first raised position clearing the terminal end 61 of the second tray means 60, and a second position beneath or beyond the shear end 61 of the tray 60 for positioning sheared discrete portions (straps) onto subjacent elements. The shear means 70 is operated in conjunction with the forming means 49 so that a strip of material is fed into the terminal shear end 61 when the shear means 70 is in, or approaches its first raised position, the shearing action occurring when the forming means is idle or not feeding formed material to the shear. Thus the forming means 49 and the shear means 70 are operated synchronously by the drive means 41 so that jam-up of the formed strip material does not occur. In addition, the shear means operates in conjunction with vacuum supply means 90 for retaining the sheared discrete portions (straps) formed by the shear moving towards its second position shearing the portions from the formed strips 46A, in order to deposit the straps upon the subjacent substrate S.

The type of material used for providing a connection between the balls E and B to the lands L2 and L3 is preferably copper which may be coated with nickel and tinned so that solder reflow will permit adequate connection of the straps 10 and 11 to the lands of the balls.

Figure 7:
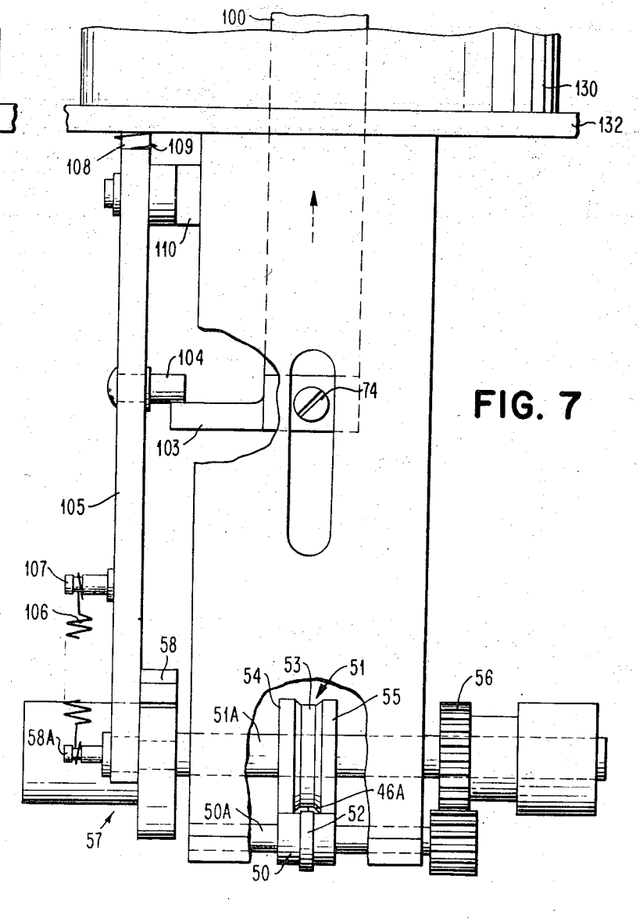
FIG. 7 is a fragmentary end elevational view of the apparatus shown in FIG. 6.

In order that the material may be properly formed, the forming means 49 includes a pair of contiguous rolls 50 and 51 (see FIGS. 3 and 7) having circumferentially disposed, substantially complementary forms adapted for receiving and forming therebetween at least one, in the present instance a pair of continuous strips of material. As shown in FIG. 7, the roll 50, in the present instance, includes a radially extending, circumferentially disposed flange 52 which cooperates with a circumferentially disposed recess 53 defined between laterally spaced radially projecting end walls 54 and 55 of the roll 51. As is evident in FIG. 7, the end walls 54 and 55 have axially converging, inwardly projecting sidewalls merging into the circumferential recess 53. In this manner, each of the strips of material 46 intermittently enters the forming rolls 50 and 51 and is formed substantially as shown in FIG. 7 so that upon shearing of the formed strip 46A, the straps have the form shown in FIG. 1. For purposes which will become more evident hereinafter, it is preferable that the formed strips 46A include an angulated leg portion 10A, 11A with an interior included angle of approximately 135 degrees.

Figure 6:
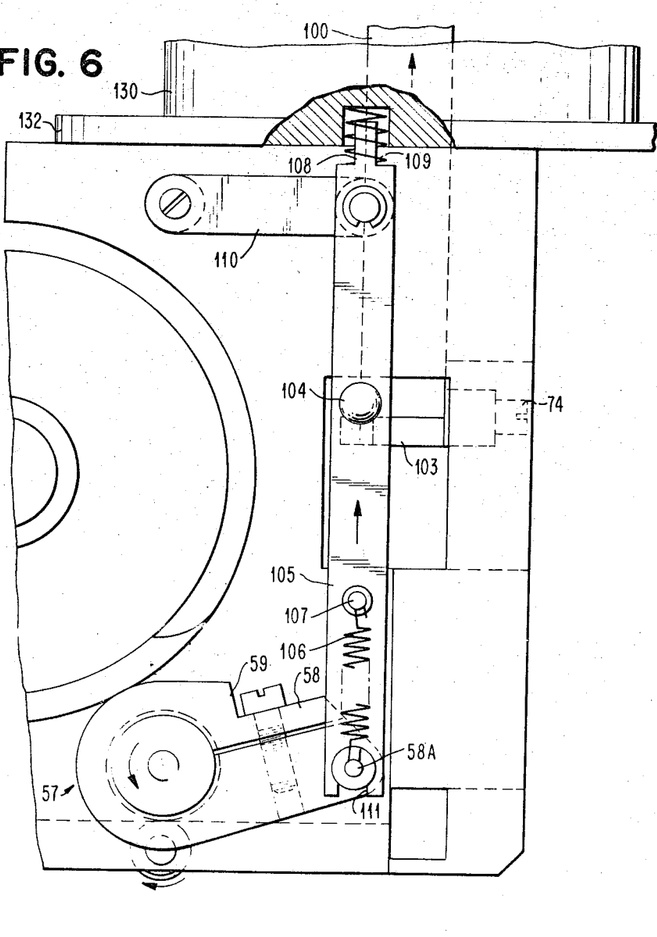
FIG. 6 is a fragmentary side elevational view of another portion of the apparatus shown in FIG. 3.

In order to pull material from the strip supply means 43 onto the tray means 60, the forming means 50 also serves the dual function of acting as feed rolls for the strip material. To this end, and referring to FIGS. 3, 6 and 7, the drive means 41 includes an upstanding reciprocating rod 100 having a recess 101 at the upper end thereof for receiving the end 39A of the beam 39. As shown in FIGS. 6 and 7, the rod 100 includes a projecting leg portion 103 which serves to cam upwardly a pin 104 when the rod is on its upward stroke. As shown in FIG. 7, the rolls 50 and 51 are mounted on shafts 51A and 50A which are interconnected as by a gear train 56. A unidirectional clutch 57, which may be of any conventional well-known type, is coupled to one of the shafts, in the illustrated instance the shaft 51A, for imparting to the forming means 49 a rotation in the direction of material feed, i.e., towards the tray 60. As shown, the unidirectional clutch 57 includes an extended end portion 58 having a pin 58A therein which loosely fits a notch 111 in an upstanding link 105. The pin 58A is connected to the link 105, the connection being by way of a tension spring 106 and pin 107 on the link 105, the opposite end of the spring 106 being connected to the pin 58A. As shown, the link 105 includes an extended end portion 108 having a compression spring 109 therearound for biasing the link 105 downwardly so that the pin 104 abuts the leg 103 of the rod 100. Connected to the upper portion of the link 105 is ia pivotally mounted stay link 110 which maintains the link 105 in a substantially vertical plane during reciprocation. In addition, the extension 58 associated with the unidirectional clutch 57 contains stop-means 59, the stop-means 59 serving to limit the clockwise rotation of the extension 58 (reference FIG. 6) upon downward movement of the link 105. In operation, the upward reciprocation of the rod 100 causes the link 105 to be raised by engagement of the leg 103 against the pin 104. This vertical upward movement biases the spring 109 while the spring 106 causes counter clockwise rotation of the forming means 49 thus forming the strips 46 into the formed strips 46A. Upon the rod 100 descending, the pin 104 maintains engagement against the leg 103 by action of the compression spring 109, the inner peripheral surface of the notch 111 associated with the link 105 bearing against the pin 58A and causing clockwise movement of the extension until the stop 59 prevents further rotation. As the clutch is undirectional, the clock-wise rotation of the extension 58 does not rotate the forming means 49.

Figure 4:
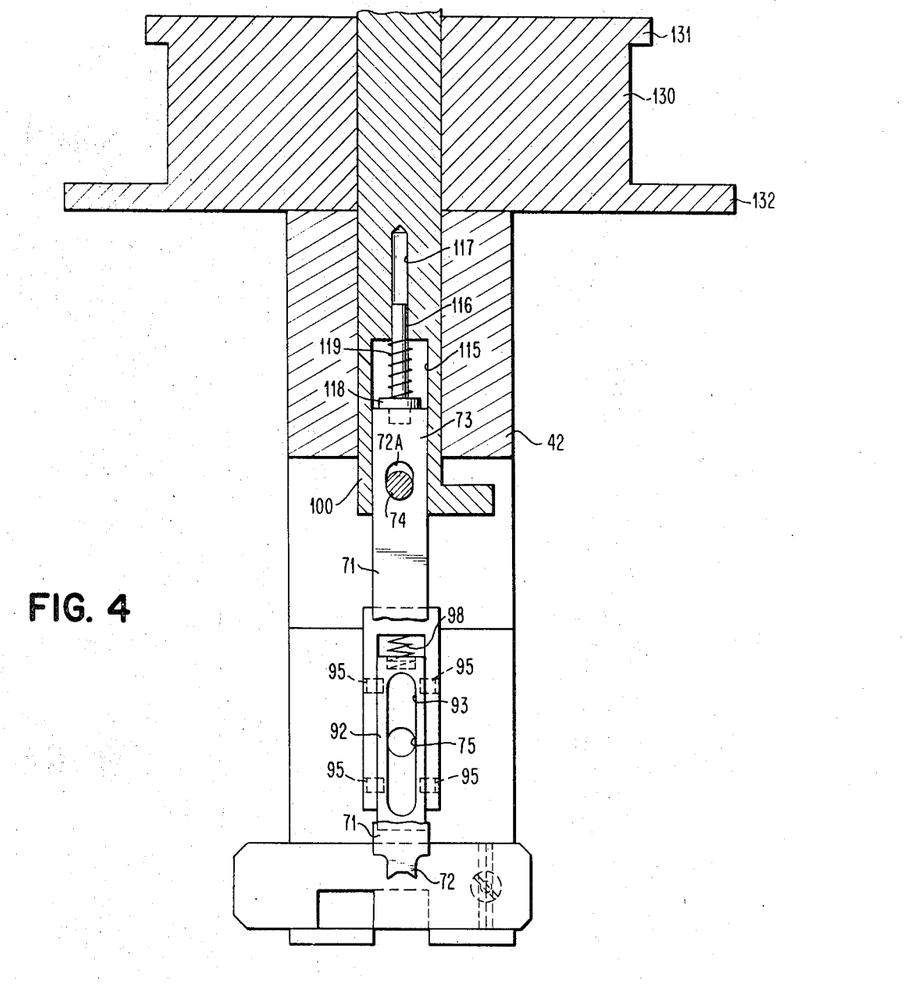
FIG. 4 is a fragmentary sectional view thinking along line 4—4 of FIG. 3.
Figure 10:
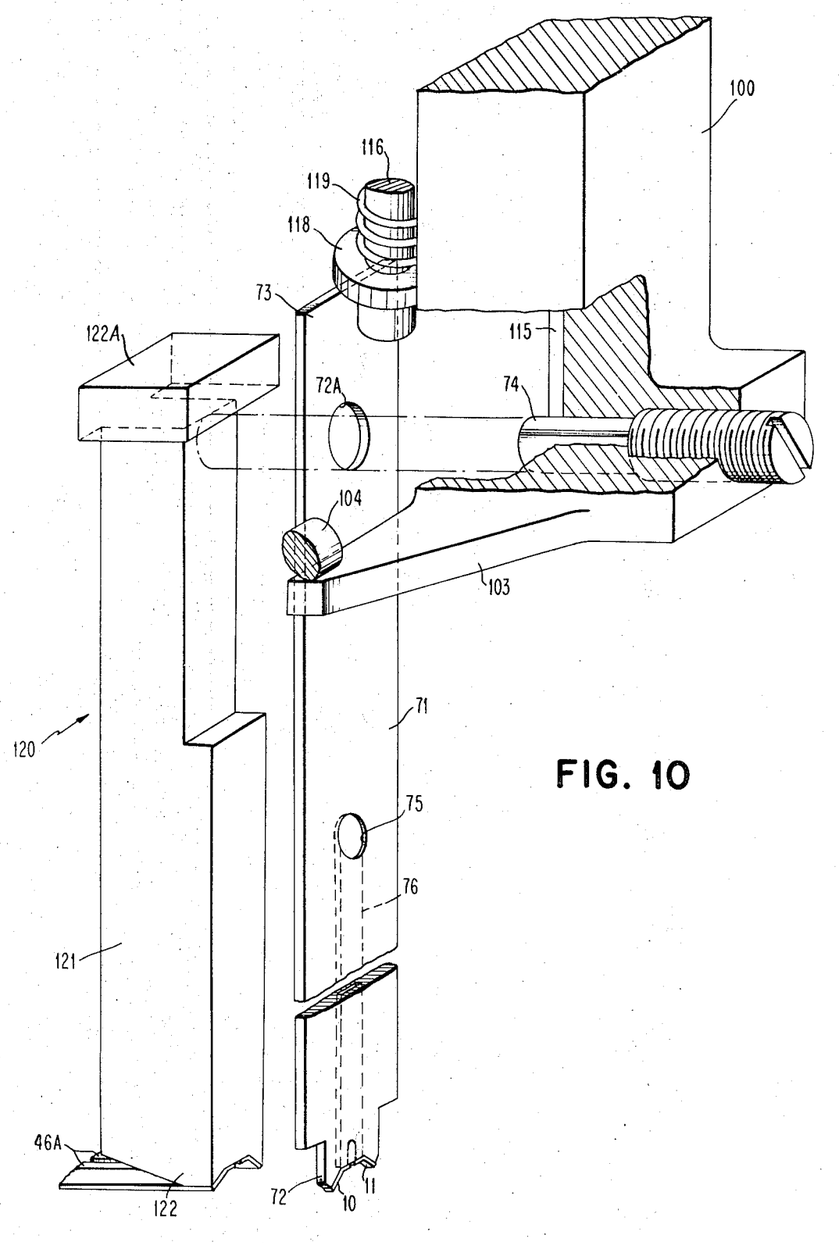
FIG. 10 is an enlarged, fragmentary, exploded perspective view of a portion of the apparatus illustrated in FIGS. 3 and 4.

In order to operate the shear means 70 in synchronism with the operation of the forming means 49, it is necessary that as the rod 100 moves up, the forming means turns in a direction to feed formed material 46A into the shear area. In this manner, as the clutch 57 is unidirectional and no rotation of the rolls occurs on the down stroke of the rod 100, it is necessary on the downward stroke of the rod 100, to actuate the shear means. To this end, the shear means 70 includes an elongated blade 71 having a sharpened lower shearing edge 72, generally conforming to the outline of the formed strips 46A, for cooperative engagement with the terminal shear end 61 of the tray 60. As shown best in FIGS. 3, 4 and 10, the blade 71 includes an elliptical aperture 72A elongated axially of the blade and adjacent the upper end 73 thereof. As best shown in FIGS. 3 and 10, connection of the shear blade 71 to the rod 100 is effected by a pin 74 which projects substantially perpendicular to the rod 100 and is adjustably connected thereto as through an enlarged foot portion 100A. For reasons which will become more evident hereinafter, the pin 74 is loosely fitted in the aperture 72 so that "slop" occurs between the drive rod 100 and the shear blade 71 upon reciprocation of the drive rod.

In order that upon shearing of the formed strips 46A, the shear blade 71 retains the straps 10 and 11 for positioning on the subjacent substrate S, releases the straps 10 and 11 once in position, the vacuum supply means 90 is in fluid communication with the straps 10 and 11 upon operation of the shear blade 71. To this end, and as best shown in FIG. 10, the blade 71 includes means defining an aperture 75 which communicates with conduit means 76 extending along the longitudinal axis of the blade 71, which conduit terminates at the lower terminal shearing edge 72 to thereby provide suction on the lower straps 10 and 11 when the vacuum supply means is connected through the aperture 75.

In order that the source of vacuum may be applied prior to the shear blade descending to shear the formed material 46A, and removed prior to positioning the straps on the substrate S, the vacuum supply means is made retractable so that upon the shear carrying the straps 10 and 11 closely adjacent the balls projecting upwardly on the chip on the substrate, the vacuum supplied to the conduit 76 will be terminated permitting placement of the straps on the balls and lands. To this end, and referring once again to FIGS. 3 and 4, a vacuum conduit 91 is shown slideably mounted in a suction block 92 having an elongated slot 93 therein to permit fluid communication between the hose 91 and the aperture 75 associated with the conduit means 76 in the shear blade. As the shear blade is slideable relative to the block 92, the slot 93 is oriented along the longitudinal axis of the blade so that fluid communication is retained despite the relative movement. As shown best in FIG. 3, the suction block 92 is pressed inwardly towards and into engagement with the shear blade 71 as by biasing means, in the present instance, including a pair of springs 94A and 94B. Projecting from the block 92 are cam follower means, in the present instance including outwardly projecting pins 95 which extend into slots 96 recessed in the side walls of a yoke shaped camming member 97. The yoke shaped cam member 97 is biased upwardly as by a compression spring 98 which maintains the pins 95 in the lower portion of their slots 96. As the shear descends shearing the formed strip 46A to form the straps 10 and 11, the foot portion 100A of the rod 100 engages the cam 97 at a point where the lower shear edge 72 is superimposed and closely adjacent to the balls E and B on the chip C associated with the substrate S. As the drive rod descends still further the cam also descends and the pins 95 engage the rearwardly sloping side walls 96A of the slot 96 causing the block 92 to be cammed rearwardly breaking the vacuum formed through the aperture 75 and conduit means 76 in the shear blade. Of course, upon the drive rod reversing direction, and moving upwardly, the spring 98 permits the cam 97 to move and assume its rest position, the biasing springs 94A and 94B associated with the block 92 permitting the suction block 92 to move inwardly into engagement with the shear blade.

The vacuum may be applied synchronously with the operation of the drive means. As shown in FIG. 8, the conduit 91 may include a flexible hose 91A connected to a valve or the like 140 which operates through a plunger 141, connected to the rotating shaft 35 to connect a vacuum supply 142 or a source of air 143. The air source may be used to purge the conduit 91 and the conduit means 76 associated with the shear blade 71.

As it is desirable that the shear blade be permitted to gently deposit the straps 10 and 11 upon the balls and lands of the chip and substrate, it is preferred that the depositing of the straps 10 and 11 on the balls and lands of the chip and substrate is not under control of the drive rod 100. To this end, and referring to FIG. 4, the lower portion of the rod 100 preferably contains a recessed portion 115 for receiving therein the upper end 73 of the shear blade 71. Positioned above the upper end 73 of the blade 71 is a push-rod 116 which fits in a groove 117 bored in the rod 100. The push-rod 116 contains a disc 118 which, by action of a biasing compression spring 119, serves to press the shear blade 71 downwardly against the pin 74. As may be recognized, upon the rod 100 moving in the downward direction of its reciprocating stroke, the pin 74 will strike the lower edge of the aperture 72 causing the shear blade 71 to move downwardly for shearing discrete portions of the preformed strips 46A. When the rod reaches the bottom of its stroke, it has engaged the cam 97 and causes the suction block 92 to move away from the shear blade, thereby decreasing sliding friction of the block against the blade. The position of the chip and balls is such that the rod 100 reaches the bottom of its stroke with the shearing edge 72 of the shear blade 71 closely adjacent, but superimposed of the balls. At this point, the push rod 116 takes over and moves the shear blade a short distance downwardly, due to the elongation of the aperture 72A in the shear blade, depositing the straps upon the balls and lands of the chip and substrate respectively. In this manner, deposition of the straps is accomplished in a gentle manner inhibiting the possibility of breakage of the chip or displacement thereof.

Figure 5:
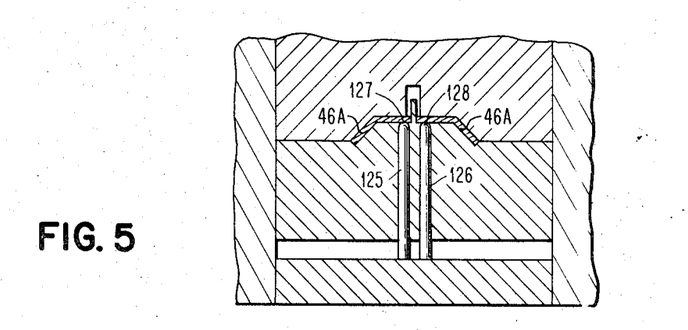
FIG. 5 is an enlarged fragmentary view taken along line 5—5 of FIG. 3.

As the balls E and B located on the chip C are extremely small, for example, .005 inch in diameter, it is necessary to provide means for preventing the straps, once placed upon the balls, from being dislodged by movement of the conveyor 12 before the straps have been soldered to the balls and lands. To this end dimpling means 120 is provided to make indentations in the lower portion of the formed strips 46A, which indentations are adapted for receipt of the balls E and B. Referring now to FIGS. 3, 5 and 10, the dimpling means 120 comprises an elongated post 121 having a lower terminal end 122 of substantially the same shape as the formed strip material 46A. The upper terminal end of the post 121 includes a projection 122A beneath which rests the pin 74 which projects through the aperture 72A of the shear blade 71. Superimposed of the pad 122 is spring biasing means, in the present instance, a compression spring 123 which engages the projection 122 at one end, and a fixed retainer 124 at the other end mounted on frame 42. Thus, as the drive rod 100 moves upwardly, the pin 74, in addition to moving the shear blade 71 upwardly, also cams the dimpling pad 120 upwardly against the spring 123. Thus the downward action of the dimpling pad against the upper surface of the tray 60 is caused by the action of the spring 123.

In order to form the slight indentations in the formed material 46A, the tray includes a pair of dimpling pins 125 and 126 (see FIG. 5), transversely spaced, and adapted to cooperate with the lower terminal end 122 of the post 121 upon its registry with the formed material 46A to provide indentations 127 and 128 in the lower portion of the straps 10 and 11. In this manner, the portion of the formed strip material 46A next to be sheared, is dimpled so that each strap formed contains indentations for proper location and retention on the balls E and B of the chip C.

As each production run of chips and substrate may be different, it is desirable to provide means for orienting the strap former and placement apparatus without requiring a major relocation of the stand 31. (See FIG. 8.) To this end, the frame 42 of the apparatus 30 is adjustably connected to the stand 31, the frame 42 including a ring 130 having an upper and lower, axially spaced, radially projecting flanges 131 and 132. As shown the platform 34 of the stand 31 embraces the ring, intermediate the flanges.

Figure 9:
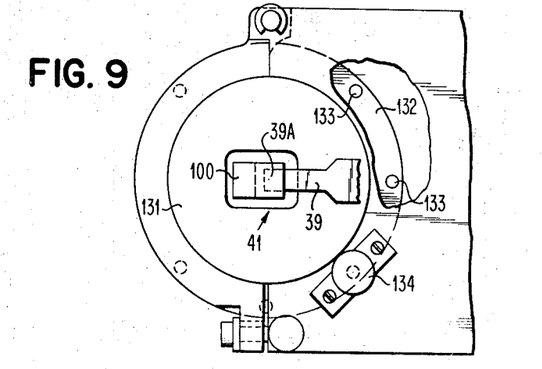
FIG. 9 is a fragmentary sectional view taken along line 9—9 of FIG. 8.

As shown in FIGS. 9 and 10, the lower flange 132 contains a plurality of circumferentially positioned angularly spaced apertures 133 adapted to receive a locking pin 134 which is mounted in the platform 34. In this manner, raising the locking pin 134 against the bias of its compression spring 135 will permit rotation of the ring 130 and thus the apparatus 30 so that the straps may be oriented in a somewhat different position for different production runs.

Thus the apparatus of the present invention provides for ease in forming and depositing straps for connection to adjacent element, the apparatus performing its function upon continuous supplies of strip-like materials and forming a strap which is relatively inexpensive and simple to manufacture.

Although the invention has been described with a certain degree of particularity, it should be understood that the present disclosure is only exemplary of the invention, and that numerous changes in the details of construction, and the combination and arrangements of parts may be made without departing from the spirit and scope of the invention as hereinafter claimed.

What is claimed is:

1. Apparatus for forming and depositing formed material at a predetermined location; said apparatus comprising:

forming means including a pair of contiguous rolls having circumferentially disposed, substantially complementary forms adapted for receiving and forming therebetween at least one continuous strip of material; strip supply means for supplying said strip of material to said forming means; tray means for receiving said formed strip from said forming means, said tray means having a terminal shear end which has an outline substantially conforming to the formed strip longitudinally spaced from said forming means; reciprocating shear means including a shear blade comprising an elongated, depending member having a shear edge thereon substantially conforming in outline to the formed strip, said shear blade cooperating with said terminal shear end to shear discrete portions of said formed strip, and operable between a first raised position clearing said terminal shear end and a second position beyond the shear end of said tray; vacuum holding means in said shear blade for holding at least one of said discrete portions upon shearing said strip, said shear means, when in said second position operable for positioning said discrete portion upon adjacent elements, and drive means connected to said shear means for feeding said strip to said shear, said drive means operable to feed said strip to said shear upon said shear clearing said terminal shear end.

2. Apparatus in accordance with claim 1, including unidirectional drive means connected to said forming rolls whereby said forming rolls feed said strip material onto said tray towards said terminal shear end; and means interconnecting said drive means to said unidirectional drive means to provide synchronous operation of said shear means and said forming rolls.

3. Apparatus in accordance with claim 1, including a reciprocating dimpling pad positioned adjacent said shear blade and superimposed of said tray means; drive means operatively connected for reciprocation of said shear blade and said dimpling pad and for synchronous feeding of said formed strip to said dimpling pad and shear blade.

4. Apparatus in accordance with claim 3 wherein said reciprocating dimpling pad includes a post, means operative to connect said post to said drive means to effect movement thereof away from said tray upon feeding of said formed strip to said terminal shear edge, and post biasing means for urging said pad towards said tray.

5. Apparatus in accordance with claim 4 including at least one detent pin in said tray and projecting from the surface thereof, underlying said formed strip, said detent pin aligned with said dimpling pad whereby, upon said post being urged by said biasing means onto said formed strip material, an indentation is formed therein.

6. Apparatus in accordance with claim 1, including drive means for reciprocation of said shear blade, conduit means in said blade and extending longitudinally thereof, means defining an aperture in said blade communicating with said conduit, and a retractable vacuum supply means abutting said blade when said blade is in said first position and operative to connect a source of vacuum to said blade when said blade is in said first position, and operable to disconnect said blade from said supply when said blade is in said second position.

7. Apparatus in accordance with claim 6, including cam means and cam follower means, one of said means on said retractable vacuum supply means and another of said means engageable by said drive means whreby, upon said blade reaching said second position, said retractable vacuum supply means is cammed away from said blade thereby breaking the vacuum formed in said conduit.

8. Apparatus in accordance with claim 6 wherein one of said drive means and said blade includes means defining an aperture elongated in the direction of shear motion, the other of said means including a pin loosely contained in said aperture to thereby provide lost motion between said shear blade and said drive means.

9. Apparatus in accordance with claim 8 including biasing means for said shear blade, said biasing means operative to urge said blade to take up said lost motion, when said blade is in said second position.

10. Apparatus in accordance with claim 1, including a frame mounting said apparatus, a relatively rotatable support connecting said apparatus to said frame, and means to lock said rotatable support to provide for angular positioning of said apparatus relative to said frame.

References Cited

UNITED STATES PATENTS

| | | | |
|---|---|---|---|
| 3,194,098 | 7/1965 | Kimball et al. | 29—203 |
| 2,896,213 | 7/1959 | Alderman et al. | 29—203 |
| 3,264,724 | 8/1966 | Griesser | 29—417 |
| 3,382,575 | 5/1968 | Gannoe | 29—417 |
| 3,429,170 | 2/1969 | Romeo | 29—203 |
| 3,341,927 | 9/1967 | Grainger | 83—100 |
| 3,465,408 | 9/1969 | Clark et al. | 83—152 |

CHARLES W. LANHAM, Primary Examiner

E. M. COMBS, Assistant Examiner

U.S. Cl. X.R.

29—203